United States Patent [19]

Hirata et al.

[11] 4,225,914
[45] Sep. 30, 1980

[54] FREQUENCY CONVERTERS

[75] Inventors: Akio Hirata, Fuchu; Suzuo Saito, Higashimurayama, both of Japan

[73] Assignee: Tokyo Shibaura Denki Kabushiki Kaisha, Kanagawa, Japan

[21] Appl. No.: 940,317

[22] Filed: Sep. 7, 1978

[51] Int. Cl.² .................................. H02M 5/257
[52] U.S. Cl. .................................. 363/160; 363/43; 363/71
[58] Field of Search ................ 363/43, 71, 72, 160

[56] References Cited

U.S. PATENT DOCUMENTS

| 3,324,374 | 6/1967 | Corey | 363/43 X |
| 3,477,010 | 11/1969 | VeNard | 363/43 |
| 3,638,094 | 1/1972 | VeNard | 363/43 |
| 3,979,662 | 9/1976 | Klein | 363/71 |

FOREIGN PATENT DOCUMENTS 70718  6/1978 Japan .

OTHER PUBLICATIONS

"Dual Current Source Converter for AC Motor Drives", IEEE, 1977, Society Annual Meeting, pp. 758–768, R. Palaniappan & J. Vithayathil.

Primary Examiner—William M. Shoop
Attorney, Agent, or Firm—Stevens, Davis, Miller & Mosher

[57] ABSTRACT

In a frequency converter of the type including a polyphase inverter which produces polyphase alternating current inherently containing higher harmonic components, a plurality of polyphase inverters are operated with a predetermined phase difference and the outputs thereof are sythesized by polyphase transformer means so as to eliminate higher harmonic components of relatively low orders, particularly the fifth and seventh higher harmonics.

6 Claims, 15 Drawing Figures

FREQUENCY CONVERTERS

BACKGROUND OF THE INVENTION

This invention relates to a frequency converter for producing polyphase alternating current having an improved waveform, more particularly a frequency converter wherein a transformer is used to combine or synthesize rectangular output currents for the purpose of obtaining an output current having a waveform close to that of a sine wave.

Inverter circuits adapted to convert a DC power into an AC power are classified into a voltage type inverter and a current type inverter depending upon whether their outputs have a rectangular wave voltage or a rectangular wave current. In the former, a large capacity capacitor or a battery is connected on the DC source side so that its source impedance is small and the inverter can drive any type of AC load but in this type current control is difficult whereby there is a defect that large current flows at the time of fault, for example DC short circuiting. On the other hand, in the current type inverter since a large DC reactor is connected on the DC side so that current control can be made relatively readily and this type is suitable to use for rapidly varying AC loads.

FIG. 1 is a block diagram showing a prior art current type inverter comprising a three phase AC source 11, a rectifier 12, a DC reactor 13 connected in series with the DC circuit, an inverter 14 and a three phase AC load 15.

FIG. 2 shows one example of the prior art inverter circuit 14 comprising three parallely connected branch circuits each including serially connected controlled semiconductor elements, for example thyristors 211, 212 and diodes 211, 222; thyristors 213, 214 and diodes 223, 224; and thyristors 215, 216 and diodes 225, 226 and commutating capacitors 231 through 236 respectively connected between adjacent branch circuits. The AC output lines are connected between diodes 221 and 222, between diodes 223 and 224 and between diodes 223 and 224 respectively. The operation of this inverter circuit has been well known. Briefly stated, as shown in FIG. 3, the waveforms of the output currents $I_R$, $I_S$ and $I_T$ of respective phases are rectangular in which the positive and negative currents flow for intervals of 120°. In a three phase inverter as shown in FIG. 2, adjacent positive and negative currents have a phase difference of 60°. Such current wave contains a larger amount of higher harmonics. Especially, it contains 20% and 70%, based on the fundamental wave, of the fifth and seventh higher harmonics which are of relatively lower orders. For this reason, where the AC load 15 comprises an AC motor, a rotating field due to the fifth and seventh higher harmonics would be formed thus creating torque ripples having a value 6 times of that of the fundamental wave.

SUMMARY OF THE INVENTION

Accordingly, it is an object of this invention to provide an improved frequency changer capable of eliminating or decreasing higher harmonics of lower orders, especially the fifth and seventh orders.

Another object of this invention is to provide an improved inverter apparatus that can stably operate polyphase alternating current motors.

According to this invention, there is provided a frequency converter of the type including a polyphase inverter which produces polyphase alternating current inherently containing higher harmonic components, characterized in that there are provided a plurality of polyphase inverters, means for operating the inverters with a predetermined phase difference, and polyphase transformer means for synthesizing the outputs of the inverters so as to obtain output polyphase alternating current and to eliminate higher harmonic components of relatively low orders.

BRIEF DESCRIPTION OF THE DRAWINGS

In the accompanying drawings:

FIG. 9b shows a current vector diagram of the embodiment shown in FIG. 9a;

FIG. 10b is a current vector diagram of the embodiment shown in FIG. 10a; and

DESCRIPTION OF THE PREFERRED EMBODIMENTS

Figure 1:
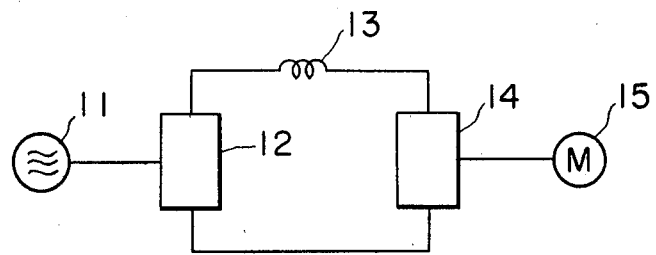
FIG. 1 is a block diagram showing the basic construction of a prior art current type inverter.
Figure 2:
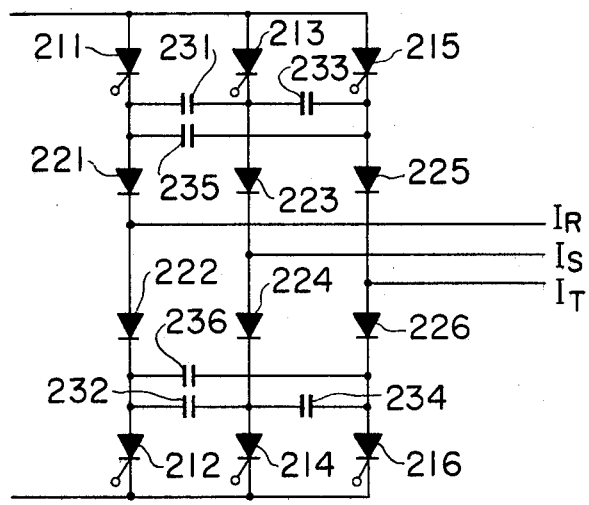
FIG. 2 is a connection diagram showing one example of a prior art inverter.
Figure 3:
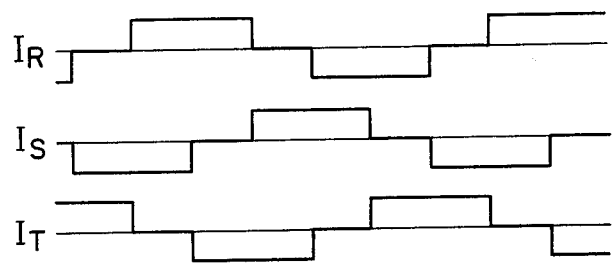
FIG. 3 shows output current waveforms of the inverter shown in FIG. 1.
Figure 4:
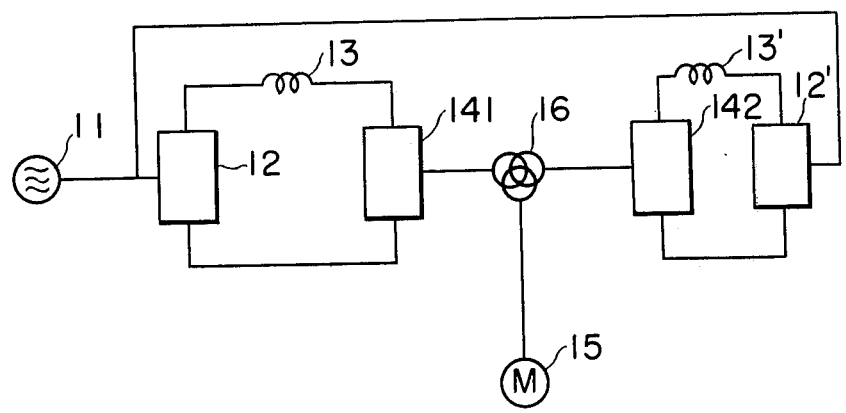
FIG. 4 is a block diagram showing one embodiment of this invention.

FIG. 4 shows a preferred embodiment of this invention which is different from the inverter shown in FIG. 1 in that serially connected DC reactor 13 and an inverter 141, and serially connected DC reactor 13' and an inverter 142 are connected in series with the direct current output circuits of rectifiers 12 and 12' respectively, and that the outputs of inverters 141 and 142 are combined or synthesized by a transformer 16 so as to supply to an alternating current load 15 an alternating current power from which low order higher harmonic components have been eliminated.

Figure 5:
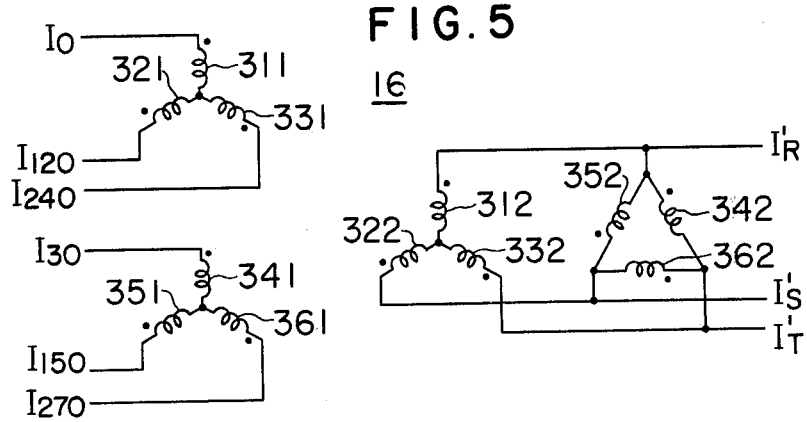
FIG. 5 shows one example of transformer connections.

FIG. 5 shows one example of the connection of transformer 16 which comprises a pair of star connected primary windings 311, 321, 331 and 341, 351 and 361, the former being supplied with currents $I_0$, $I_{120}$ and $I_{240}$ having phases of 0°, 120° and 240°, respectively from inverter 141 while the latter with currents $I_{30}$, $I_{150}$ and $I_{270}$ having phases 30°, 150° and 270° respectively from inverter 142. Primary winding 311 and secondary winding 312 have a turn ratio of $1:k/\sqrt{3}$ and primary winding 341 and secondary winding 342 have a turn ratio of $1:k$, where k represents the voltage ratio of the transformers. Another corresponding primary and secondary windings have identical turn ratios. The secondary windings 312, 322 and 332 are connected in a star, while the secondary windings 342, 552 and 362 are connected in a delta. These star and delta connected secondary windings are connected in parallel to supply alternating currents $I_R'$, $I_S'$ and $I_T'$ to the load 15.

Figure 6:
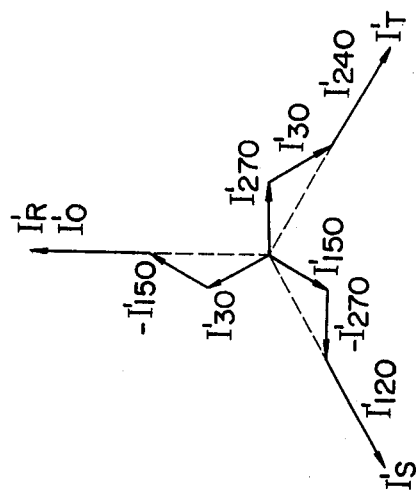
FIG. 6 is current vector diagram.
Figure 7:
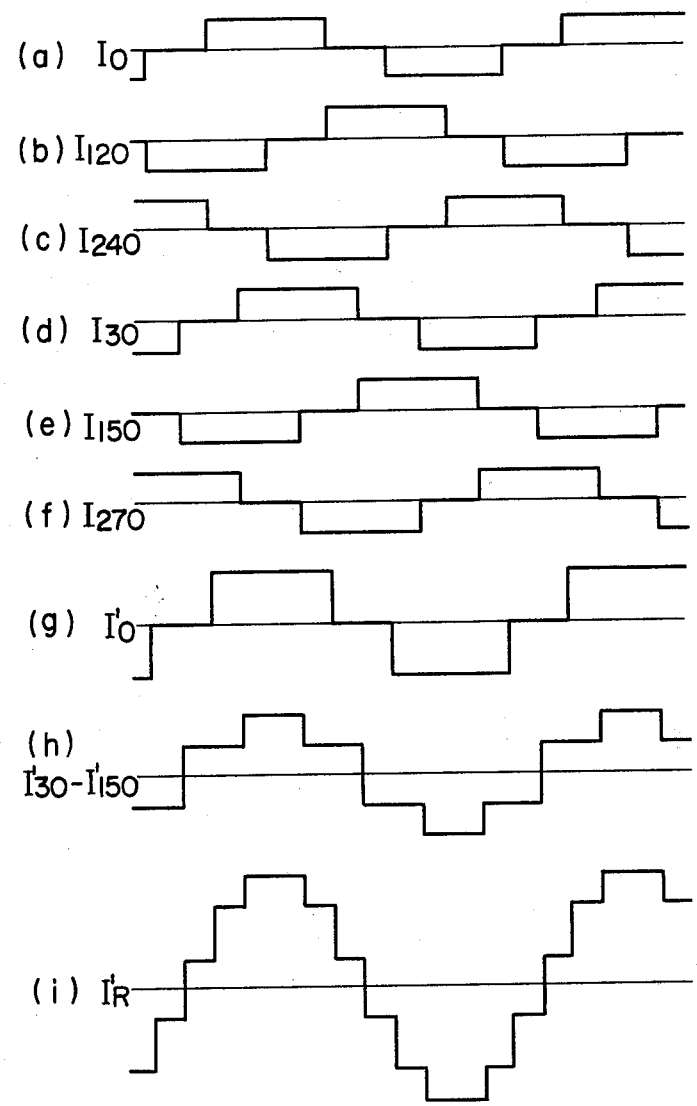
FIGS. 7a through 7i are waveforms which are useful to explain the operation of this invention.

FIG. 6 is a vector diagram showing the phase relationship of phase currents $I_R'$, $I_S'$ and $I_T'$ and FIG. 7a through 7i are waveforms showing the manner of combining respective phase currents. More particularly, FIGS. 7a through FIG. 7f show waveforms of output currents $I_0$ through $I_{270}$ which flow through the primary windings 311 through 361. When commutating the primary current from primary winding 311 to 312, since the turn ratio is 1:k/√3, current $I_0'$ having the same phase as current $I_0$ but having a value of √3/k times flows through the secondary winding 312. When transforming from primary windings 341 and 351 to secondary windings 342 and 352, since the turn ratio between these windings is 1:k and since secondary windings 342 and 352 form a portion of the delta connection, the current flowing through the juncture of these secondary windings is shown by $I_{30}'-I_{150}'$. The waveforms of current $I_0'$ and $I_{30}'-I_{150}'$ are shown by FIGS. 7g and 7h, respectively and the waveform of the output current $I_R'$ obtained by combining these two currents is stepped as shown by FIG. 7i. Analysis of this stepped wave shows that the percentages of the fundamental wave, the 11th higher harmonic, the 13th higher harmonic, and the 15th higher harmonic, so on are 100%, 9.1%, 7.7%, 4.3% . . . respectively. This means that, according to this invention, the fifth and seventh higher harmonics which are of relatively lower orders are eliminated thus preventing 6 times torque ripples and that the percentages of the 11th and 13th higher harmonics are limited to the same percentages as a rectangular wave having a duration of 120°.

Figure 8:
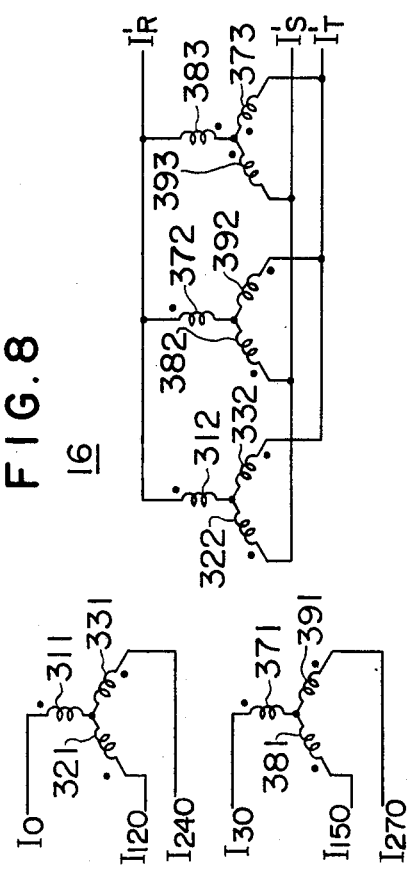
FIG. 8 is a connection diagram showing another example of the transformer connections.

FIG. 8 shows different connection of transformer 16 in which the connections of primary windings 311, 321, 331, secondary windings 312, 322, 332 and the relationship of currents $I_R'$, $I_S'$ and $I_T'$ are the same as those of the previous embodiment. The primary windings 371, 381, 391 respectively supplied with currents $I_{30}$, $I_{150}$ and $I_{270}$ are coupled with secondary windings 372, 382 and 392 and with tertially windings 373, 383 and 393. Primary winding 371, secondary winding 272 and tertiary winding 273 have a turn ratio of 1:k:k. To provide the same vector diagram as that shown in FIG. 6, with reference to current $I_R'$ secondary winding 372 is connected in parallel with the secondary winding 312 but the tertiary winding 383 is connected in parallel opposition with the secondary winding 312 (see polarity marks shown by black spots). In the same manner, with reference to currents $I_S'$ and $I_T'$ secondary windings 382 and 392 are respectively connected in parallel with the secondary windings 322 and 332, while the tertially windings 393 and 373 are connected in parallel opposition. With this connection, each of the output currents $I_R'$, $I_S'$ and $I_T'$ would have the same waveform as that shown in FIG. 7i thereby eliminating the fifth and seventh higher harmonic components without increasing the contents of the 11th and 13th higher harmonic components.

Although foregoing description relates to the connections of the transformers utilized in the inverter circuit shown in FIG. 4, it should be understood that the invention is applicable to any system which generates a plurality of sets of three phase powers being diphased fundamental frequency waves. Furthermore, it should be understood that the turn ratios described above are only illustrative and that any primary connections may be used so long as desired second current can be produced.

Figure 9A:
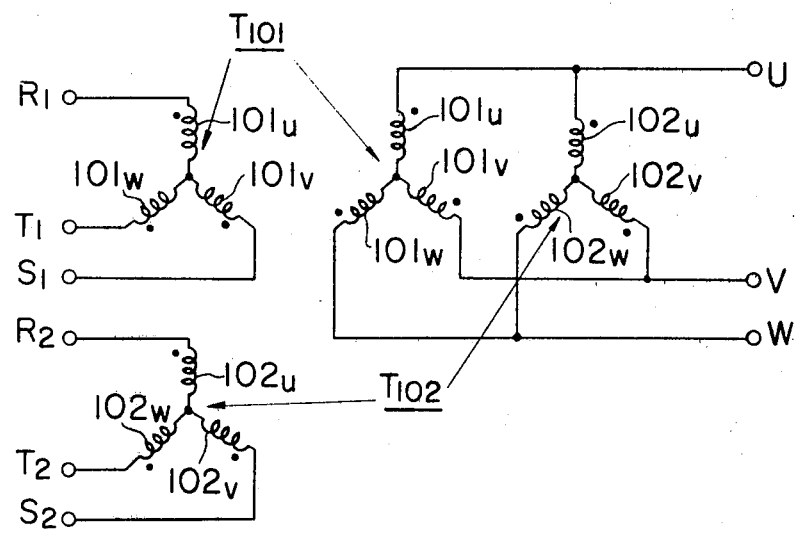
FIG. 9a shows another embodiment of this invention.
Figure 9B:
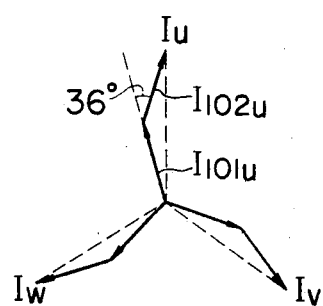

FIG. 9a shows another embodiment of this invention in which the primary and secondary windings of transformers $T_{101}$ and $T_{102}$ are connected as shown and the turn ratios of these transformers are made to be equal. When three phase rectangular wave currents having a phase difference of 36° and a width of 120° are passed through terminals $R_1$, $S_1$, $T_1$ and $R_2$, $S_2$, $T_2$ secondary currents $I_U$, $I_V$ and $I_W$ which are synthesized as shown by the vector diagram shown in FIG. 9b would flow out through secondary terminals U, V and W. The waveform of the secondary current $I_0$ can be analyzed as follows in terms of the input direct current $I_d$ of the inverter.

$$I_0 = \frac{16 I_d}{\pi} \sum_{n=1}^{\infty} \left( \frac{1}{n} \sin \frac{n\pi}{2} \cdot \sin \frac{n\pi}{3} \cdot \cos \frac{n\pi}{10} \cdot \sin \frac{n}{6} \cdot \sin \omega t \right)$$

As this equation clearly shows, the fifth higher harmonic component of the secondary current is zero, and the seventh higher harmonic is reduced to 1/12 of the fundamental wave.

Figure 10B:
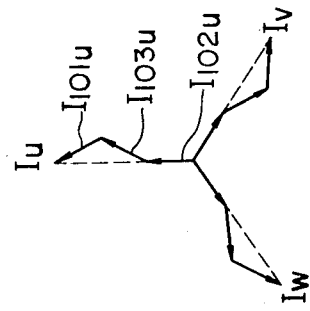
Figure 10A:
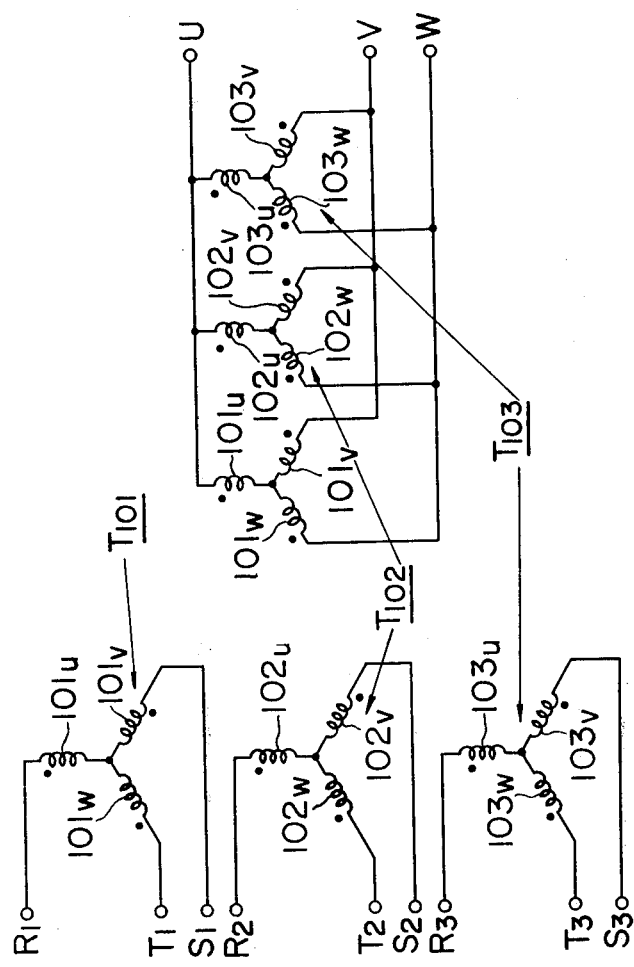
FIG. 10a is a connection diagram showing another embodiment of this invention.

FIG. 10a shows still further modification of this invention. The primary and secondary windings of transformers $T_{101}$, $T_{102}$ and $T_{103}$ are connected as shown and the turn ratios of these transformers are made to be equal. When three phase rectangular wave currents having a phase difference of 24° and a width of 120° are applied to input terminals $R_1$, $S_2$, $T_2$, $R_3$, $S_3$ and $T_3$, secondary currents $I_U$, $I_V$ and $I_W$ which are synthesized as shown by the vector diagram shown in FIG. 10b would be obtained through secondary terminals U, V and W. The waveform of the secondary current $I_0$ can be analyzed as follows in terms of the direct current $I_d$ of the inverter connected to the primary side of the transformers $T_{101}$, $T_{102}$ and $T_{103}$.

$$I_0 = \frac{8 I_d}{\pi} \cdot \sum_{n=1}^{\infty} \left( \frac{1}{n} \sin \frac{n\pi}{2} \cdot \sin \frac{n\pi}{2} \cdot \frac{2 \cos \frac{2n\pi}{15} + 1}{2 \cos \frac{2\pi}{15} + 1} \cdot \sin \frac{n\pi}{6} \cdot \sin \cdot (\omega t)/t \right)$$

This equation too clearly shows that the fifth harmonic components of the output secondary currents $I_U$, $I_V$ and $I_W$ are zero, and that the seventh higher harmonic and the eleventh higher harmonic are reduced to about 1/20 and 1/40 respectively of the fundamental wave.

Figure 11:
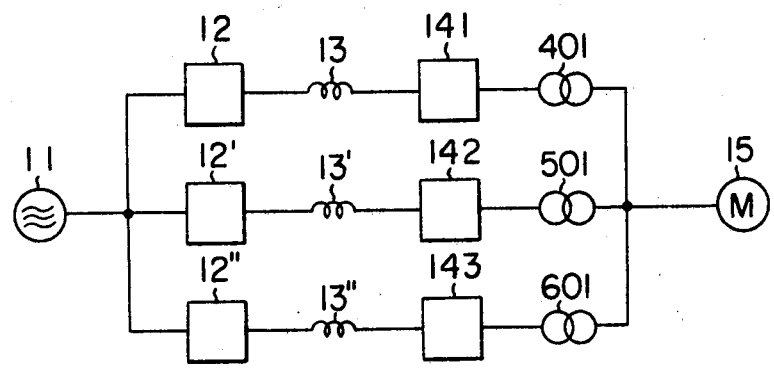
FIG. 11 is a block diagram showing yet another embodiment of this invention.
Figure 13:
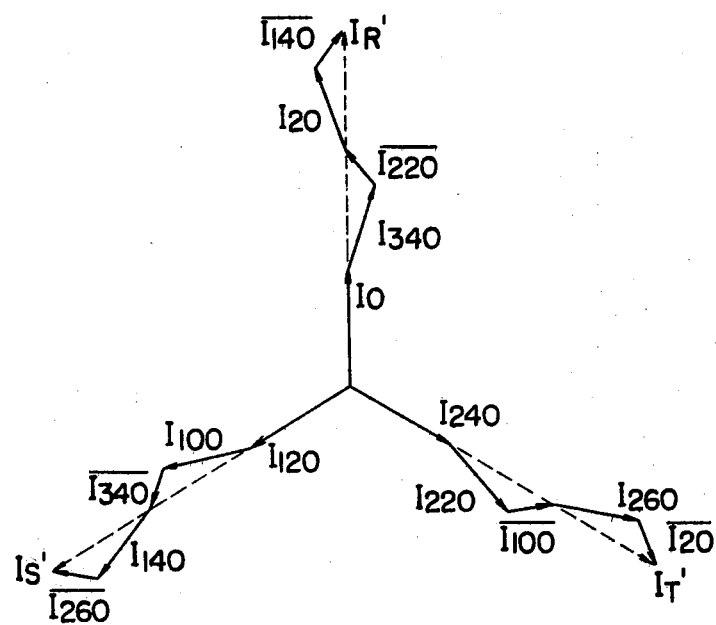
FIG. 13 shows a vector diagram useful to explain the operation of the embodiment shown in FIGS. 11 and 12.
Figure 12:
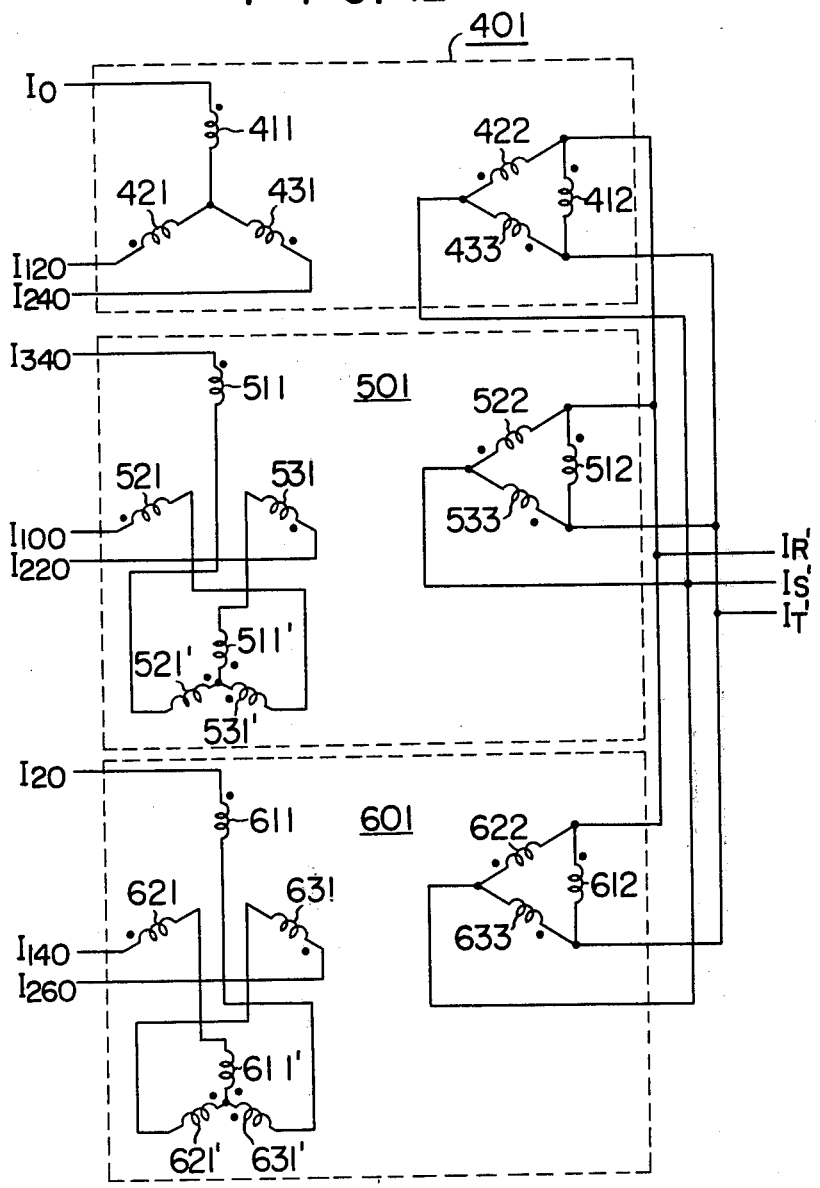
FIG. 12 shows the connection diagram of the transformer apparatus utilzed in the embodiment shown in FIG. 11.

FIG. 11 illustrates another embodiment of this invention in which three 6 phase inverters are operated in parallel with a phase difference of 20°. More particularly, alternating currents respectively produced by inverters 141, 142 and 143 which are connected to alternating current source 11 through rectifiers 12, 12' and 12", and DC reactors 13, 13' and 13" are synthesized through output transformers 401, 501 and 601 to drive a three phase alternating motor 15. The detail of the connection of the output transformers 401, 501 and 601 are shown by FIG. 12. In FIG. 12, the turn ratio of winding 411 (421, 431), 511 (521, 531), 511' (521', 531') 611 (621, 631) and 611' (621', 631') is selected to be 1:2/√3 sin 40°: 2/√3 sin 20°: 2/√3 sin 40°: 2/√3 sin 20°, and the secondary windings are connected in parallel in the same manner as in FIG. 5. The primary winding of transformes 401 comprises simple star connected three phase windings, whereas each of the primary windings of transformers 501 and 601 comprises star connected three phase windings, and 120° dephased three phase windings respectively connected in series opposition therewith as shown by the polarity marks. On the other hand, all secondary windings of transformers 401, 501 and 601 are connected in delta. The vectors of the output current synthesized in this manner are shown in FIG. 13 which shows that the phases of currents $I_R'$, $I_S'$ and $I_T'$ perfectly coincide with those of currents $I_0$, $I_{120}$ and $I_{240}$.

The percentage of higher harmonics contained in the output current obtained by the circuit shown in FIG. 11 are: 5th-0%, 7th-0%, 11th-0%, 13th-0%, 17th-5.8%, 19th-5.3%, 23th-0%, 25th-0%, 29th-0%, 31th-0%, 35th-2.9%, 37th-2.7% . . . . Thus such low order higher harmics as the 5th, 9th and 13th are perfectly eliminated whereby the torque ripple created when the AC motor is driven by the output current can be reduced thus assuring high efficiency operation.

Although in the embodiment shown in FIG. 11, three inverters were used it will be seen that it is possible to decrease the higher harmonics contained in the output current by increasing the number of inverters. For example, where 4 inverters are used it is possible to eliminate the 5th, 7th, 11th, 13th, 17th and 19th higher harmonics thereby further improving the operating characteristics of the alternating current motor.

As above described according to this invention there are provided at least two sets of polyphase output currents which are dephased a predetermined angle and the output currents are synthesized to form polyphase alternating current so that it is possible to decrease higher harmonics of relatively low orders, specifically the fifth and seventh higher harmonics without increasing other higher harmonics. Accordingly, when the frequency converter of this invention is used to drive a three phase alternating current motor, it is possible to stably operate the motor without forming 6 times torque ripples.

We claim:

1. In a frequency converter of the type including a plurality of three phase inverters which produce three phase alternating currents inherently containing higher harmonic components, and a three phase transformer means for synthesizing the outputs of said inverters to obtain three phase alternating current, the improvement wherein said inverters are current type inverters, and said three phase transformer means comprise a plurality of three phase primary windings respectively energized by the outputs of said inverters and a plurality of parallel connected secondary windings thereby reducing harmonic components of lower orders, one of said primary windings and one of said secondary windings having a turns ratio of $1:k\sqrt{3}$ while the other primary winding and the other secondary winding have a turns ratio of 1:k, where k represents the voltage ratio of said transformer means.

2. The frequency converter according to claim 1, wherein said three phase primary windings comprise a pair of star connected three phase windings and said secondary windings comprise a start connected winding and a delta connected winding which are connected in parallel.

3. The frequency converter according to claim 1, wherein said three phase primary windings comprise a pair of star connected primary windings and said secondary winding comprise a pair of star connected secondary windings and a star connected tertially winding which is connected in parallel opposition with said pair of secondary windings and wherein the turns ratio of said primary windings, said secondary windings and said tertially winding is 1:k:k.

4. The frequency converter according to claim 1, wherein each of said inverters produces rectangular three phase alternating current having a phase difference of 36° and a width of 120°, and said three phase transformer means comprises a first three phase transformer having star connected primary and secondary windings and a second three phase transformer having star connected primary and secondary windings, the primary windings of said first and second transformers being respectively connected to the outputs of said inverters, the secondary windings of said first and second transformers being connected in parallel.

5. The frequency converter according to claim 1, wherein each of said inverters produces rectangular three phase alternating current having a phase difference of 36° and a width of 120° C. and said three phase transformer means comprises three three phase transformers each having a star connected primary winding and a star connected secondary winding, the three primary windings being connected to the output terminals of said inverter, three secondary windings of said three phase transformers being connected in parallel, and said three phase transformers having the same turns ratio.

6. The frequency converter according to claim 1, wherein said inverters comprise three three phase inverters and said transformer means comprises three three phase transformers, a primary winding of a first one of said three three phase transformers comprises start connected three phase windings which are connected to the output of a first one of said inverters, primary windings of said three three phase transformers are connected respectively to the outputs of second and third ones of said inverters, each one of the primary windings of said second and third three phase transformers comprises a star connected three phase windings respectively connected in series opposition with 120° dephased windings, and secondary windings of said three three phase transformers are connected in delta and are connected in parallel.

* * * * *